(12) United States Patent
Casteran

(10) Patent No.: US 7,080,864 B2
(45) Date of Patent: Jul. 25, 2006

(54) APPARATUS FOR SHIPPING AND STORING ELONGATED MEMBERS

(75) Inventor: Bernard Casteran, Voisisn-le-Bretonneux (FR)

(73) Assignee: Drilltec Patents & Technologies Company, Inc., Houston, TX (US)

(*) Notice: Subject to any disclaimer, the term of this patent is extended or adjusted under 35 U.S.C. 154(b) by 0 days.

(21) Appl. No.: 10/355,499

(22) Filed: Jan. 31, 2003

(65) Prior Publication Data

US 2003/0205907 A1 Nov. 6, 2003

Related U.S. Application Data (60) Provisional application No. 60/380,067, filed on May 3, 2002.

(51) Int. Cl.
*B66C 1/16* (2006.01)

(52) U.S. Cl. .................... 294/67.3; 294/67.4; 211/60.1

(58) Field of Classification Search ...... 294/67.1–67.4, 294/68.3, 143, 82.1, 74; 211/59.4, 60.1; 248/68.1

See application file for complete search history.

(56) References Cited

U.S. PATENT DOCUMENTS

| | | | |
|---|---|---|---|
| 1,777,394 A | 10/1930 | Coe | |
| 1,779,484 A | 10/1930 | McWane | |
| 1,940,186 A * | 12/1933 | Romine | 410/38 |
| 2,059,390 A | 11/1936 | Pagel | |
| 2,075,711 A | 3/1937 | Gilley | |
| 2,472,843 A * | 6/1949 | Muise | 294/67.4 |
| 2,491,013 A | 12/1949 | Noll et al. | |
| 2,778,491 A | 1/1957 | Taylor et al. | |
| 2,849,027 A | 8/1958 | Tetyak | |
| 2,850,182 A | 9/1958 | Tetyak | |
| 2,938,747 A | 5/1960 | Pitts | |
| 3,253,707 A * | 5/1966 | Gooding | 206/597 |
| 3,263,830 A | 8/1966 | Anderson | |
| 3,283,893 A | 11/1966 | Durocher et al. | |
| 3,476,260 A | 11/1969 | Jay | |
| 3,504,811 A * | 4/1970 | Wegener et al. | 294/74 |
| 3,734,281 A | 5/1973 | Armstrong | 206/65 B |
| 3,747,780 A | 7/1973 | Schneider | 214/10.5 R |
| 4,099,617 A | 7/1978 | Nist, Jr. | 206/443 |
| RE30,373 E | 8/1980 | Nist, Jr. | 206/443 |
| 4,227,854 A | 10/1980 | Coffey | 414/746 |
| 4,378,923 A | 4/1983 | Takei | 248/68 R |
| 4,384,697 A | 5/1983 | Ruhe | 248/68 R |
| 4,565,289 A | 1/1986 | Lesueur | 206/443 |
| 4,579,304 A | 4/1986 | Williams | 248/68.1 |
| 4,595,161 A | 6/1986 | Williams | 248/68.1 |
| 4,610,362 A * | 9/1986 | Remp et al. | 211/59.4 |
| 4,702,311 A | 10/1987 | Bizard | 165/162 |

(Continued)

FOREIGN PATENT DOCUMENTS

DE  56 217  12/1965

(Continued)

*Primary Examiner*—Dean J. Kramer
(74) *Attorney, Agent, or Firm*—Conley Rose, P.C.

(57) ABSTRACT

A lifting system includes a lifting plate disposed on each end of two lifting frames. Each lifting frame has an upper segment and a lower segment and optionally one or more intermediate segments. Each lifting plate comprises a unitary body that has a lifting eye in an offset extended portion and one or more openings for receiving the ends of the segments. Additionally, the lifting system can include two packaging frames. The lifting system is preferably configured such that two lifting frames are the center frames in a four frame configuration, while the two packaging frames are the end frames.

30 Claims, 8 Drawing Sheets

U.S. PATENT DOCUMENTS

| | | | |
|---|---|---|---|
| 4,941,698 A | 7/1990 | Klibert et al. | 294/82.12 |
| 5,071,183 A * | 12/1991 | McDermott et al. | 294/67.2 |
| 5,123,547 A | 6/1992 | Koch | 211/59.4 |
| 5,267,648 A | 12/1993 | Baker | 206/446 |
| 5,403,055 A * | 4/1995 | Allison | 294/67.1 |
| 5,412,858 A | 5/1995 | Brown | 29/450 |
| 5,522,633 A | 6/1996 | Massi | 294/81.52 |
| 5,542,339 A | 8/1996 | Kaczmarczyk et al. | 91/508 |
| 5,649,632 A | 7/1997 | Terashima et al. | 211/59.4 |
| 5,779,295 A | 7/1998 | Auston | 294/67.1 |
| 5,782,459 A * | 7/1998 | Klann | 254/323 |
| 5,860,627 A | 1/1999 | Edwards | 248/68.1 |
| 6,261,037 B1 | 7/2001 | Richards et al. | 410/36 |
| 6,322,034 B1 | 11/2001 | O'Malley | 248/346.02 |

FOREIGN PATENT DOCUMENTS

| | | |
|---|---|---|
| DE | 2208 139 | 8/1973 |
| FR | 1.460.399 | 11/1966 |
| FR | 2 598 696 | 5/1986 |

* cited by examiner

APPARATUS FOR SHIPPING AND STORING ELONGATED MEMBERS

CROSS-REFERENCE TO RELATED APPLICATIONS

The present application claims priority under 35 U.S.C. §119(c) of the benefit of 35 U.S.C. §111(b) provisional application Ser. No. 60/380,067 filed May 3, 2002 and entitled "Lifting Plates System." Application No. 60/380,067 is hereby incorporated herein by reference.

STATEMENT REGARDING FEDERALLY SPONSORED RESEARCH OR DEVELOPMENT

Not Applicable.

BACKGROUND OF THE INVENTION

1. Field of the Invention

The invention relates generally to an apparatus for packaging, transporting, and storing. More specifically, the invention relates to a frame system for packaging, transporting, and storing elongated members, such as tubing or pipe. More specifically, the invention relates to a unitary lifting plate for attachment to a frame for packaging, transporting, and storing elongated members.

2. Description of the Related Art

Various types of elongated members, including but not limited to piping and tubing, are used in construction projects and other activities, such as petroleum drilling and delivery operations and sewer system projects. For example, the drilling and production of hydrocarbon wells typically requires large quantities of tubing as a component of a drillstring. Normally, this tubing is available in sections of twenty to forty feet in length. These individual sections are then connected together to form the drillstring. A standard hydrocarbon well drilled on land may employ thousands of feet of tubing, requiring thousands of individual sections of tubing to be handled while drilling the well. A deep-water offshore well may require considerably more tubing.

Elongated member packaging systems are recommended for shipping, transporting, handling, and storing of the elongated members between the member's site of fabrication and its site of operation. Typically, the elongated members are transported from the fabrication facility to the well site by truck or supply boat. The ability to effectively package, store, and transport the elongated members can save substantial time and expense, directly impacting the economies and efficiencies of a project. It is thus desirable to have equipment for and methods of effectively packaging, storing, and transporting elongated members without damaging the elongated members.

Various prior art systems for storing pipes include cross members that have depressions therein. The depressions are generally concave cavities into which pipes are laid. Typically, multiple cross members are used in a system, with rows of pipes being placed between the cross members. The multiple cross members are then coupled to one another, typically at the edges of the cross members, by one or more steel or nylon bands, or by a tightening frame. This secures the cross members, and thus the elongated members, together. Such systems adequately package elongated members, but in order to move the elongated members, lifting slings must be placed around the packaged elongated members. This has several drawbacks.

First, the lifting sling contacts the elongated members. Some elongated members are made from highly sensitive material, such as chrome alloy, or have a surface sensitive to uncontrolled contact, which requires that the members not contact the lifting sling. Second, placing a lifting sling around the packaged members is logistically difficult and time consuming because a person needs to thread the sling between the ground and the bottom of the packaged members or, if multiple packages are stacked upon one another, between the top of one set of packaged members and the bottom of another set of packaged members.

Additionally, some prior art lifting frames comprise a plate with a hole in it welded to a steel frame. In such cases, the force created when the bundle of tubes is lifted becomes focused at the weld. Such an arrangement has a natural weak point at its weld, thereby lessening the amount of load the lifting frames can carry.

The present invention overcomes the deficiencies of the prior art by utilizing a unitary lifting plate having a lifting eye and an opening. The unitary configuration provides a lifting plate with no welds, and consequently no weak points. Additionally, the opening distributes the load more evenly over the frame than prior art plates with holes. Additionally, the lifting eye allows the sling or other lifting apparatus to move the packaged members without the sling or other lifting apparatus touching the elongated members.

SUMMARY OF THE INVENTION

The present invention features a lifting system comprised of two lifting frames. Each lifting frame comprises two lifting plates, an upper segment, and a lower segment. Each lifting plate comprises a unitary body that has a lifting eye and an opening. The lifting plate is disposed on the ends of the upper and lower segments. The lifting frame can further include at least one additional, intermediate segment that is disposed between the upper and lower segments.

Additionally, the lifting system can include two packaging frames. The packaging frames are similar to the lifting frames, one difference in the preferred embodiment being the absence of a lifting plate on the packaging frames. In a preferred embodiment of the system, the lifting system is configured such that two lifting frames are the center frames in a four frame configuration, while the two packaging frames are the end frames.

The present invention comprises a combination of features and advantages which enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENT

Figure 1:
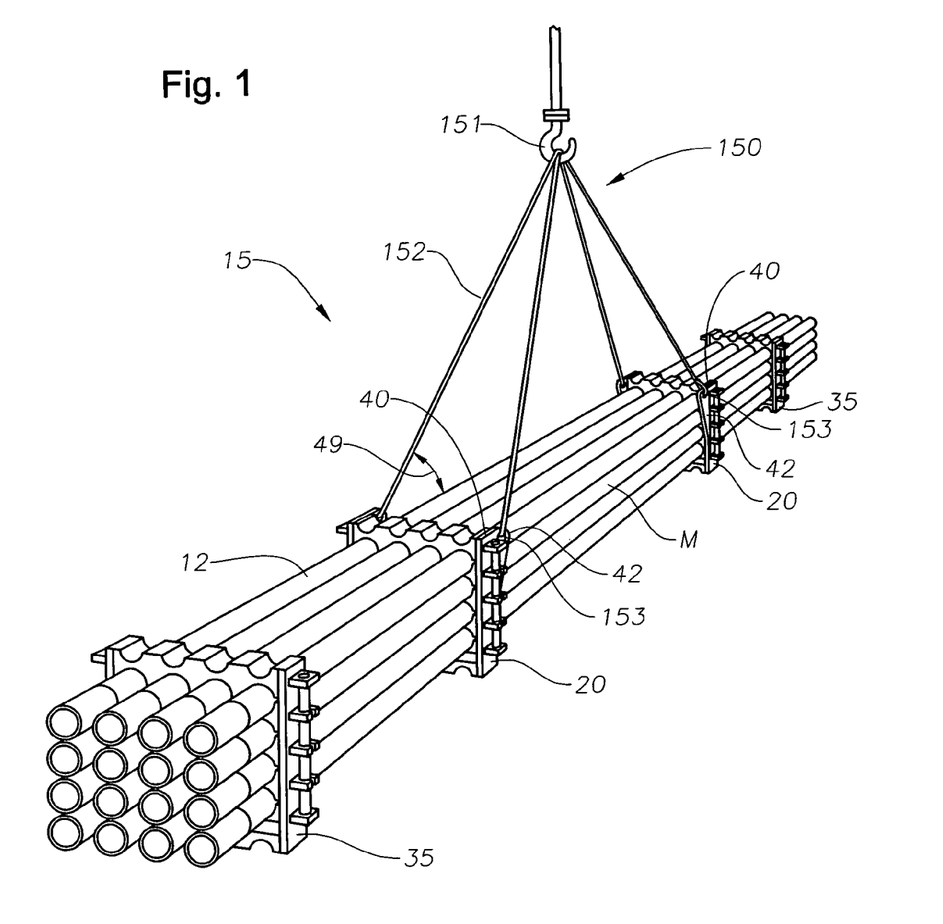
FIG. 1 is a perspective view of an embodiment of the lifting system.

Referring initially to FIG. 1, lifting system 15 is shown. Lifting system 15 preferably comprises two lifting frames 20 and two packaging frames 35 for lifting bundles of elongated members 12, such as the pipes shown. Lifting frames 20 couple to a lifting apparatus 150, which supplies the necessary force to lift the bundle of elongated members 12. The lifting apparatus 150 shown in FIG. 1 comprises a central lifting hook or eye 151 connected to one of the ends of a plurality of lifting lines or slings 152, which couple to lifting frames 20 by means of individual lifting hooks or eyes 153 on the other ends of lifting lines or slings 152. It should be appreciated that the lifting lines or slings 152 may have different lengths from one lifting apparatus 150 to another.

FIG. 1 shows a preferred configuration for bundling and lifting elongated objects. Specifically, in a preferred embodiment, the two lifting frames 20 include lifting plates 40 disposed thereon, while packaging frames 35 do not include a lifting plate 40. The lifting frames 20 are preferably located between packaging frames 35, on opposite sides of the midpoint M of elongated members 12, and equidistant from midpoint M to balance the load of the members 12 during lifting. Further, lifting frames 20 are preferably installed with an extended portion 42 (see FIGS. 2 through 4) of lifting plates 40 extending towards midpoint M and towards one another.

Figure 2:
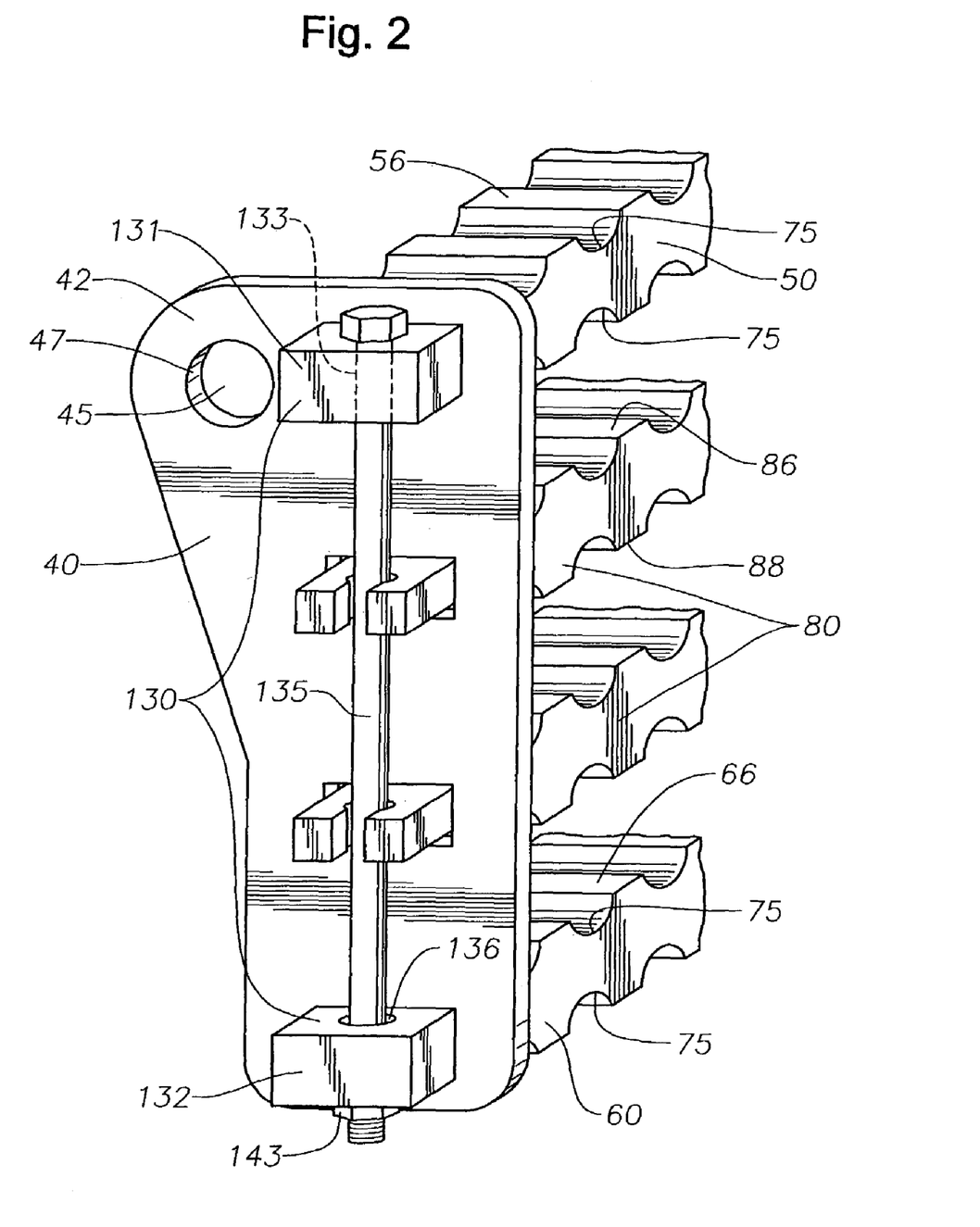
FIG. 2 is a perspective view of an embodiment of a lifting frame.
Figure 3:
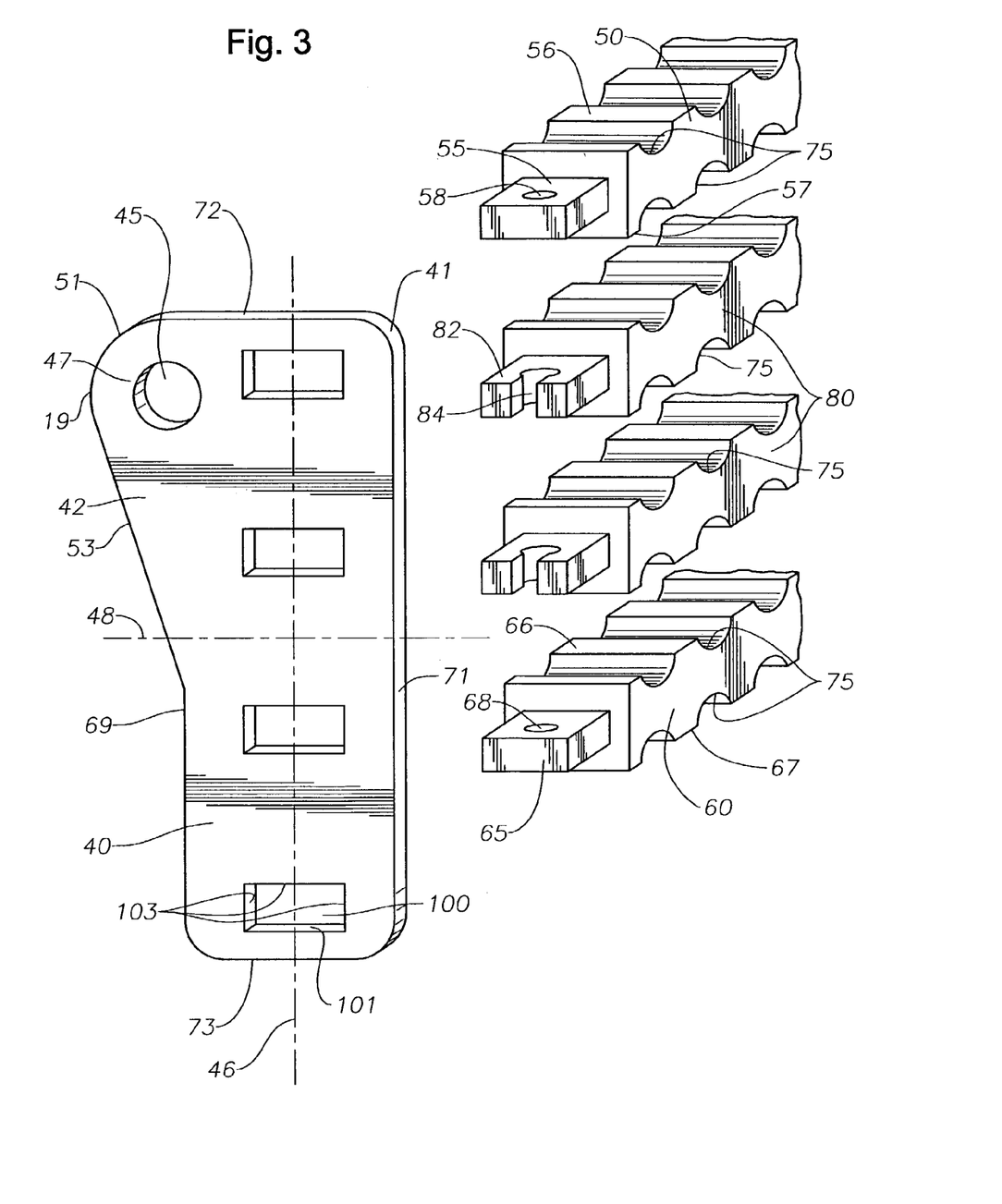
FIG. 3 is an exploded perspective view of an embodiment of a lifting frame.

Turning now to FIGS. 2 and 3, a lifting plate 40 is disposed on each end of a lifting frame 20. Lifting plate 40 comprises a body 19 which is generally rectangular with inner and outer longitudinal sides 69, 71, respectively, and upper and lower edges 72, 73, respectively. Extended portion 42 extends from the inner longitudinal side 69 adjacent upper end 72. A lifting eye 45 is disposed through extended portion 42. Body 19 is, preferably a unitary member. As used herein, unitary means made from a single piece of material, i.e., having no welds or seams. Body 19 is preferably made from steel, but can also be made from non-metallic material, including but not limited to polyethylene, polyvinyl chloride, polypropylene, Teflon, plastic, or composite plastic. It should be appreciated that the material and the thickness of the material are selected such that the lifting plate will have sufficient strength to allow the lifting apparatus 150 to lift the bundle of elongated members 12.

Figure 4A:
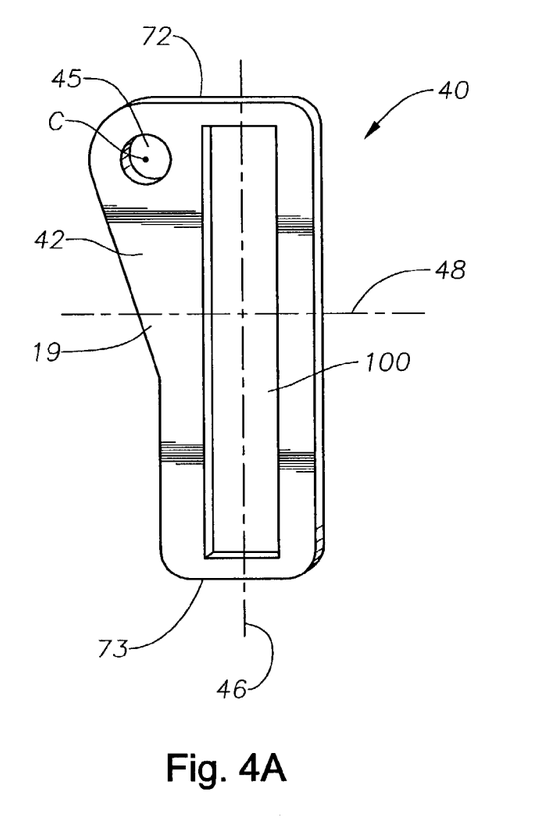
FIG. 4A is a perspective view of an embodiment of a lifting plate showing an alternative arrangement of the openings.
Figure 4B:
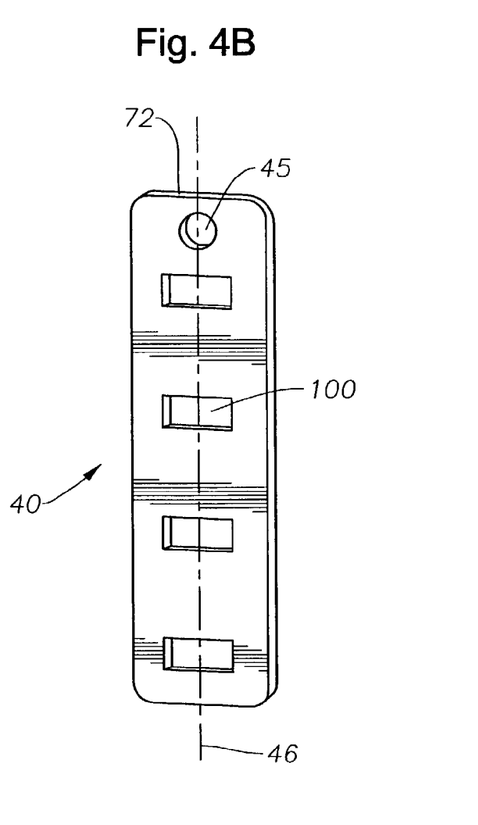
FIG. 4B is a perspective view of an embodiment of a lifting plate showing an alternative placement for the lifting eye.

Referring now to FIGS. 4A and 4B, lifting eye 45 has a center C and is preferably disposed substantially in extended portion 42. As shown on FIG. 4A, lifting eye 45 is preferably offset from the vertical central axis 46 of lifting plate 40 and above the horizontal central axis 48 of lifting plate 40. It should be appreciated that lifting eye 45 may be located elsewhere, including but not limited to being located along vertical central axis 46 between upper edge 72 and the uppermost opening 100, as shown in FIG. 4B. Lifting eye 45 is shown as circular in shape in the figures. However, the invention is not so limited and lifting eye 45 can take any shape.

It should also be appreciated that extended portion 42 could extend the entire longitudinal length of the lifting frame 20 and lifting plate 40. By reducing the longitudinal length of the extended portion 42 to only a portion that extends above the horizontal central axis 48, substantial material and costs are saved. Also it is preferred that extended portion 42 not extend above the upper edge 72 and only extend laterally away from inner longitudinal side 69 a sufficient length to accommodate the lifting eye 45. Further, the peripheral edge of extended portion 42 preferably includes a radius 51 and a tapered side 53, which extends from radius 51 to inner longitudinal side 69. It is also preferred for the other corners of lifting plate 40 to be rounded such as at 41.

Preferably, upper edge 72 and lower edge 73 of plate 40 (see FIG. 3) do not extend beyond top 56 of upper segment 50 or below bottom 67 of lower segment 60, respectively. This prevents contact between the elongated members that may be in a lifting system with the elongated members in another lifting system 20 that is stacked below the first lifting system.

Lifting plate 40 also preferably includes a plurality of openings 100 for mounting lifting plate 40 onto a frame 20. Each opening 100 forms a lifting support surface 101 for engagement with frame 20 and for the lifting of frame 20.

Referring again to FIGS. 2 and 3, frame 20 comprises a plurality of support segments including an upper segment 50, a lower segment 60, and optionally, one or more intermediate segments 80. Upper segment 50, lower segment 60 and any intermediate segments 80 have two ends 55, 65, and 82, respectively, upwardly facing, top sides 56, 66, and 86, respectively, and downwardly facing, bottom sides 57, 67, and 88, respectively. Only one of the ends 55, 65, and 82 are shown in FIGS. 2 and 3. Ends 55, 65 and 82 have a generally rectangular cross-section but can have other cross-sectional shape or size and can differ in shape and/or size from one another, even within the same lifting frame 20.

In a preferred embodiment, body 19 has at least two openings 100, as shown for example in FIGS. 2 and 3. More preferably, the number of openings 100 in body 19 equals the total number of upper, intermediate, and lower segments 50, 80, 60 being used in a particular lifting frame 20. In such an embodiment, each end 55, 65, 82 has a corresponding opening 100. However, as shown in FIG. 4A, other configurations, such as a single opening 100 are possible and within the scope of the invention.

Openings 100 preferably have a size and shape comparable to that of ends 55, 65, 82 thereby allowing openings 100 to slidingly receive the ends 55, 65, 82 of segments 50, 60, 80, respectively. It can be appreciated that openings 100 can differ in shape and/or size from the ends 55, 65, 82 and can differ in shape and/or size from one another, even within the same lifting plate 40.

Ends 56, 57 of upper and lower segments 50, 60 preferably have apertures 58, 68 disposed vertically therethrough respectively. Ends 82 of intermediate segments 80 preferably have a U-shape cross-section that forms a vertical slot 84 therethrough. Ends 56, 57, and 82 are capable of being extending through openings 100 in lifting plate 40.

Figure 14:
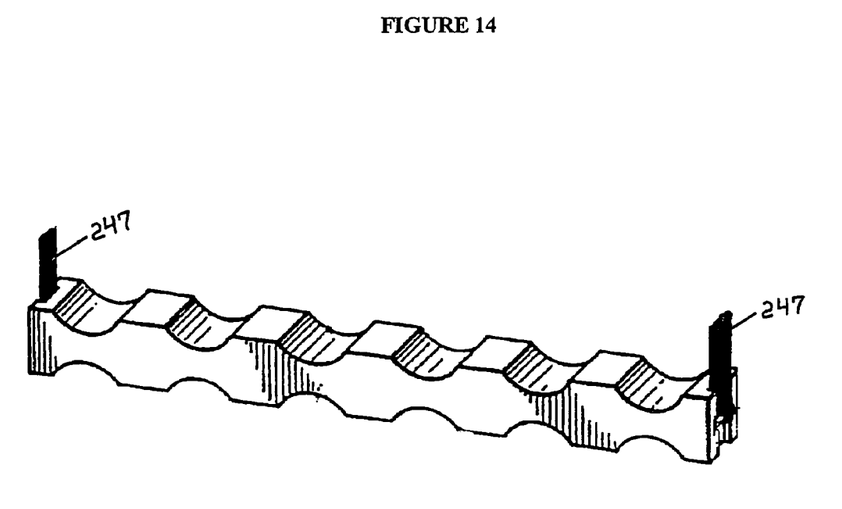
FIG. 14 shows an embodiment of the coupling means disposed on a segment.

Referring again to FIG. 2, lifting frame 20 further comprises a coupling means 130. Coupling means 130 can consist of an elongated member or may be formed from other devices such as nylon or steel bands. See U.S. Pat. No. 5,123,547. Coupling means 130 shown in FIG. 2 comprises rod 135, sleeve 131, and sleeve 132. Coupling means 130 can consist of strap 247. See FIG. 14.

Figure 5:
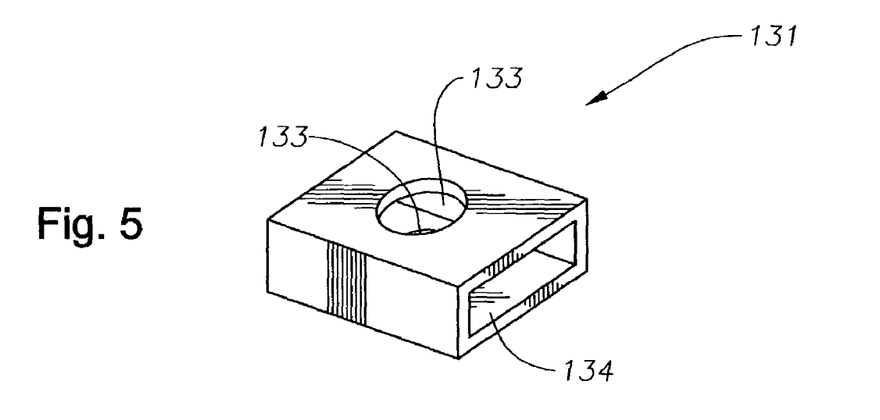
FIG. 5 is a perspective view of an embodiment of a sleeve.
Figure 6:
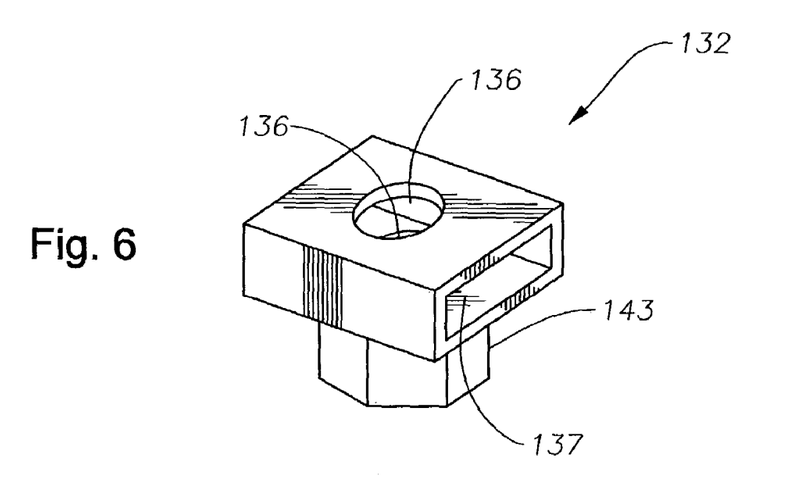
FIG. 6 is a perspective view of an embodiment of a sleeve.
Figure 7:
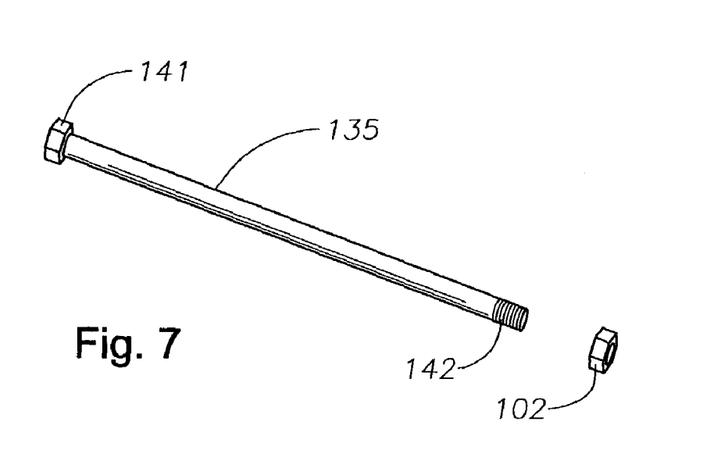
FIG. 7 shows an embodiment of a coupling means.

Referring now to FIGS. 5, 6, and 7, sleeve 131 has a bore 133 and an opening 134. Sleeve 132 is an alternative embodiment and has a bore 136, an opening 137, and a cavity 143 that extends vertically from opening 137. Sleeve 131 and sleeve 132 are interchangeable and can be used with respect to upper segment 50 or lower segment 60. Bores 133, 136 are sized to allow coupling means 130, such as rod 135, to pass through.

In the embodiment shown in FIG. 2, sleeve 131 and sleeve 132 are coupling with end 55 of upper segment 50 and end 65 of lower segment 60, respectively. Specifically, end 55 is disposed within opening 134 such that aperture 58 of end 55 aligns with bore 133 of sleeve 131. Similarly, end 65 is disposed within opening 137 such that aperture 68 of end 65 aligns with bore 136 of sleeve 132. Still referring to FIG. 2, rod 135 is disposed through aligned bore 133 and aperture 58, aligned bore 136 and aperture 68, and vertical slot 84 of intermediate segments 80, if an intermediate segment 80 is used. It should be appreciated that it is not necessary to use sleeves 131 and 132. Rather, rod 135 can be disposed through apertures 58, 68 of ends 55, 65, respectively, without the sleeves.

As shown in FIG. 7, rod 135 preferably has a fixed end 141 and a threaded end 142. In the embodiment shown in FIG. 2, fixed end 141 is larger than bore 133, while threaded end 142 is smaller than bore 136. Fixed end 141 prevents rod 35 from passing any further through bore 133 and aperture 58. Nut or other fastener 102 can be coupled to threaded end 132 below end 65, thereby securing upper segment 50, lower segment 60, and intermediate segment 80 if used, as well as the elongated members 12 therein. The nut or other fastener 102 may be housed within portion 143 of sleeve 132.

Upper, lower, and intermediate segments 50, 60, 80 can have saddles or recesses 75 on their top sides 56, 66 and their bottom sides 57, 67, respectively, as shown in FIGS. 2 and 3, for receiving and supporting one side of one of the elongated members 12. However, upper segment 50 can have recess 75 on bottom side 57 only and lower segment 60 can have recesses 75 on bottom side 67 only.

Figure 8:
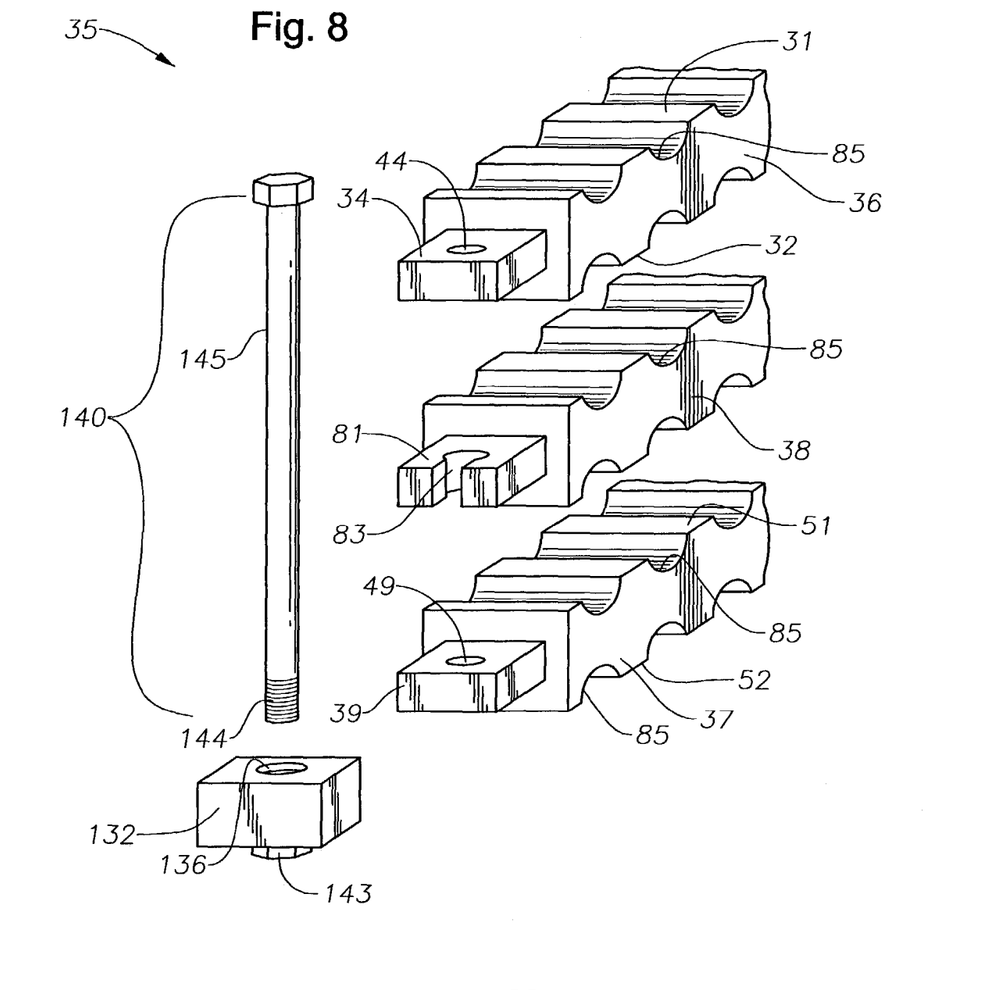
FIG. 8 is an exploded perspective view of a packaging frame.

Turning now to FIG. 8, an embodiment of packing frame 35 is shown. Preferably, packaging frame 35 comprises a top segment 36 and a bottom segment 37, and may also comprise one or more middle segments 38. Top segment 36 has two ends 34, an upper side 31, and a lower side 32. Bottom segment 37 has two ends 39, an upper side 51 and a lower side 52. Only a single end 41 and a single end 51 are shown. Upper side 31, lower side 32, upper side 51, and lower side 52 preferably have recesses 85 in which to place elongated members 12.

Ends 34, 39 have apertures 44, 49 that run vertically therethrough, respectively. In a preferred embodiment, packaging frame 35 further comprises a middle segment 38 having ends 81 (only a single end 81 is shown and recesses 85). Each end 81 preferably forms a U-shaped member having a vertical passage 83, but may also take other forms such as a member having an aperture therethrough.

Packaging frame 35 further comprises a coupling means 140. Coupling means 140 includes any device or member that is capable of securing top segment 36 to bottom segment 37, such as an elongated member or steel or nylon bands. In certain embodiments, coupling means 140 is also capable of securing top, bottom, and middle segments 36, 37, 38 to one another. In the embodiment shown in FIG. 8, coupling means 140 is an elongated segment 145 having a threaded end 144 that is capable of passing through aperture 44, vertical passage 83, and aperture 49. Threaded end 144 may pass through and connect with sleeve 132 (shown in detail in FIG. 6).

Figure 9:
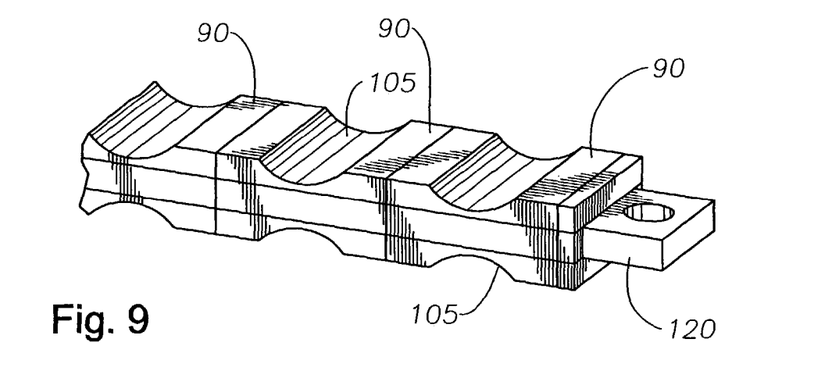
FIG. 9 is a perspective view of an embodiment of upper and lower segments of a lifting frame and/or top and bottom segments of a packaging frame.
Figure 10:
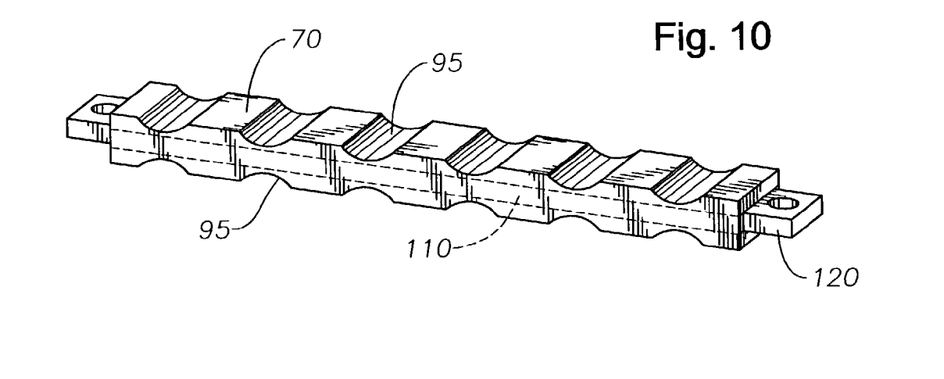
FIG. 10 is a perspective view of an embodiment of upper and lower segments of a lifting frame and/or top and bottom segments of a packaging frame.
Figure 11:
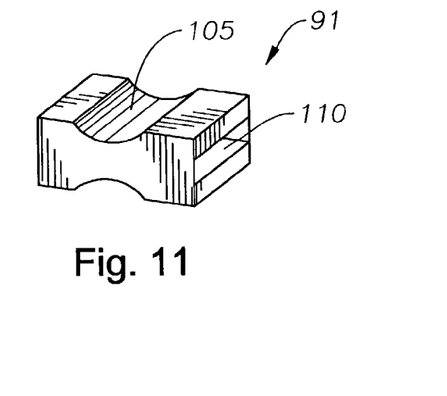
FIG. 11 is a perspective view of an embodiment of a short segment.
Figure 12:
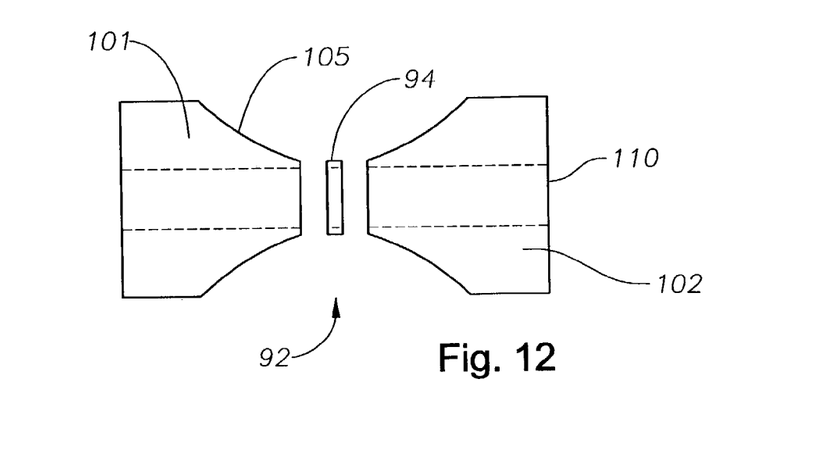
FIG. 12 is a perspective view of an embodiment of a short segment.
Figure 13:
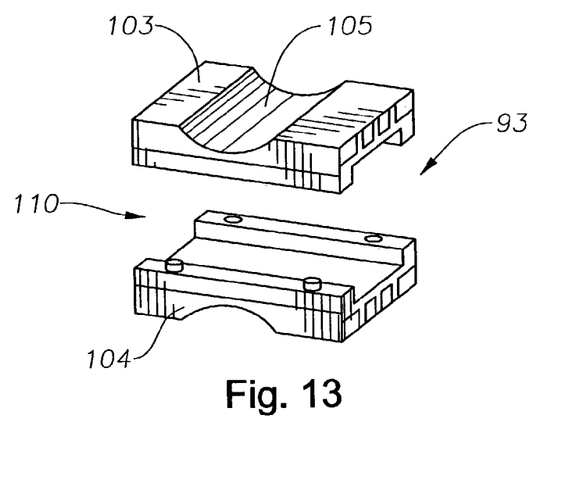
FIG. 13 is a perspective view of an embodiment of a short segment.

Referring now to FIGS. 9 and 10, an elongated segment 70 and a plurality of short segments 90 are shown. Elongated segment 70 or short segments 90 can make up upper, lower, and intermediate segments 50, 60, 80 of FIGS. 2 and 3 and/or top, bottom, and middle segments 36, 37, 38 of FIG. 8. Elongated member 70 and short segment 90 are preferably made from a lightweight, solid non-metallic material, including but not limited to polyethylene, polyvinyl chloride, polypropylene, Teflon, plastic, or composite plastic. Some examples of elongated segment 70 and short segment 90 can be found in U.S. Pat. No. 5,123,547, which is hereby incorporated herein by reference. Elongated segment 70 has saddles or recesses 95 on at least one side, but preferably has saddles or recesses 95 on both sides.

Turning to FIGS. 9 through 13, short segment 90 has a saddle or recesses 105 on at least one side, but preferably on both sides. For example, short segment 90 can be an integral member 91 (FIG. 7), a vertically split member 92 having a first portion 101 and a second portion 102 (FIG. 8), or an horizontally split member 93 having a first portion 103 and a second portion 104 (FIG. 9). Vertically split member 92 may include a spacer 94 that allows the size of recess 105 to be increased depending on needs.

Elongated segment 70 and short segment 90 can be solid members, but preferably have a passage 110. Passage 110 allows elongated segment 70 and short segment 90 to be disposed onto a supporting member 120. Supporting member 120 is preferably made from galvanized steel, but can be made from any material with sufficient strength to support the type of elongated objects being packaged or transported. Supporting member 120 can take any form with any cross-sectional shape, including being a hollow or solid rectangular member. Additionally, supporting member 120 can be comprised of more than one member each having an identical or a different form and/or cross-sectional shape.

Multiple short segments 90 can be disposed on supporting member 120, thereby providing flexibility in the width of the lifting frame 20 or packaging frame 35 and thus the number of tubulars or other elongated members that can be placed in lifting frame 20 or packaging frame 35. Elongated segment 70 can also be attached to supporting member 120 by injection molding.

A preferred method of using lifting system 20 is to place two lower segments 60 spaced apart from one another a predetermined distance apart and then to place elongated members 12 into recesses 75 in lower segments 60. Once all recesses 75 are occupied with elongated members 12, then upper segment 50 is disposed on top of elongated members 12 directly above lower segment 60. If one or more intermediate segments 80 are also being used, then, before upper segment 50 is used, an intermediate segment 80 is disposed on top of elongated members 12 and directly above lower segment 60. This step is repeated until the desired number of layers of elongated members 12 are stacked.

After upper segment 50 is installed, then the ends 55, 65, 82 of upper segments 50, lower segments 60, and intermediate segments 80 are inserted into one or more of the openings 100 in body 19 of a lifting plate 40. A similar lifting plate 40 is also installed on the opposite ends 55, 65, 82 of upper segments 50, lower segments 60, and intermediate segments 80. As best shown in FIGS. 2 and 3, openings 100 are configured to slidingly receive the ends 55, 65, 82 such that the lifting support surface 101 of the openings 100 engages and supports the bottom sides 57, 67, and 88 of upper segment 50, lower segment 60, and intermediate segment or segments 80, respectively. Further, the remaining three surfaces 103 formed by openings 100 slidingly engage the other sides, including top sides 56, 66, and 86, of upper segments 50, lower segments 60, and intermediate segments 80, respectively. Coupling means 130 is used to couple segments 50 and 60 (as well as 80 if used) together, thereby creating a bundle of elongated members 12 that is ready for lifting.

The sliding engagement between the lifting plate surfaces 101 and 103 and segment sides secures the lifting plate 40 to lifting frame 20 and further provides bearing surface engagements between the lifting plate 40 and lifting frame 20 when the lifting apparatus 150 places a lifting force onto the bundle of elongated members 12. As shown in FIG. 1, it should be appreciated that the force placed by the individual lifting hook or eye 153 from one of the lifting lines or slings 152 will place a moment on lifting plate 40 and lifting frame 20. This moment will be countered by the bearing engagement between the lifting plate surfaces and the lifting segment sides.

As shown in FIG. 2, the support surfaces 101 created by openings 100 spread the lifting forces among the segments 50, 60 and 80 of the lifting frame 20 causing the segments 50, 60 and 80 to share the lifting loads such that the lifting force is not all placed on an upper support of the lifting frame.

It should also be appreciated that the lifting eye 45 preferably includes an arcuate bearing surface 47 against which the individual lifting hook or eyelet 153 will engage during the lifting of the bundle by the lifting apparatus 150. Since the lifting lines or slings 152 may vary between lifting apparatus 150. Engagement angle 49, as shown in FIG. 1, will vary between lifting apparatus 150 and therefore the arcuate bearing surface 47 must have sufficient arcuate length to accommodate any particular engagement angle 49. In particular, the arcuate bearing surface 47 provides a curvature which allows the lifting hook and eyelet 153 to move to the engagement angle 49. Thus, although the lifting eye 45 may have any shape, it is preferred that the lifting eye shape include an arcuate bearing surface 47. Of course the lifting eye 45 must have a sufficiently large opening to receive the lifting hook or eyelet 153.

It should also be appreciated that locating the lifting eye 45 in an extended portion 42 extending inwardly toward midpoint M and the another lifting eye 45 directs the lifting lines or slings 152 away from the elongated members 12 to avoid any engaging contact between the elongated members 12 and the lifting lines or slings 152.

It should be noted and appreciated that the foregoing describes a system using two lifting frames 20 and no packaging frames 35. If packaging frames 35 are used, the steps are similar in that two bottom segments 37 are spaced apart from one another. Elongated members 12 are then placed into recesses 85 in bottom segments 37. Once all recesses 85 are occupied with elongated members 12, then top segment 36 is disposed on top of elongated members 12 directly above bottom segment 37. If one or more middle segments 38 are also being used, then, before top segment 36 is used, a middle segment 38 is disposed on top of elongated members 12 and directly above bottom segment 37. This step is repeated until the desired number of intermediate segments 38 are used.

After top segment 37 is placed, coupling means 140 is then used to couple segments 36 and 37 (as well as 38 if used) together, thereby creating a bundle of elongated members 12 that is ready for lifting.

While preferred embodiments of this invention have been shown and described, modifications thereof can be made by one skilled in the art without departing from the spirit or teaching of this invention. The embodiments described herein are exemplary only and are not limiting. Many variations and modifications of the system and frame are possible and are within the scope of the invention. Accordingly, the scope of protection is not limited to the embodiments described herein, but is only limited by the claims that follow, the scope of which shall include all equivalents of the subject matter of the claims.

What is claimed is:

1. An apparatus for use in securing a frame for lifting, transporting, or storing elongated members, the frame having upper and lower ends, said apparatus comprising:
   a unitary planar body disposed vertically on the upper and lower ends of the frame, said unitary planar body having a central vertical axis;
   said body having a lifting eye, said lifting eye being adjacent the upper end of the body; and
   said body further having at least one opening capable of receiving the upper or lower end of the frame, said opening being disposed along said central vertical axis.

2. The apparatus of claim 1, wherein said body has an extended portion and wherein said lifting eye is substantially disposed in said extended portion.

3. The apparatus of claim 1, wherein said lifting eye has a center, said center of said lifting eye being disposed on said central vertical axis.

4. The apparatus of claim 1, wherein said body has at least a first opening and a second opening, and wherein said first opening is capable of receiving the upper end of the frame and said second opening is capable of receiving the lower end of the frame.

5. The apparatus of claim 1, wherein said body is made from steel.

6. The apparatus of claim 1, where said body is made from non-metallic material.

7. A frame for use in lifting, transporting, or storing elongated objects, comprising:
   a first lifting plate having a first unitary body and a first central vertical axis, said first unitary body having a first lifting eye and at least one opening;
   a second lifting plate having a second unitary body and a second central vertical axis, said second unitary body having a second lifting eye and at least one opening;
   wherein said first lifting eye is at least partially offset from said first central vertical axis and wherein said second lifting eye is at least partially offset from said second central vertical axis;
   an upper segment having a first end and a second end;
   a lower segment having a first end and a second end;
   a coupling means for coupling said lifting plates to said upper segment and said lower segment; and said first end of said upper segment and said first end of said lower segment being disposed in said opening of said first unitary body and said second end of said upper segment and said second end of said lower segment being disposed in said opening of said second unitary body.

8. The frame of claim 7, wherein said first body has an upper opening and lower opening, wherein said first end of said upper segment is disposed in said upper opening of said first body, said second end of said upper segment being disposed in said upper opening of said second body, said first end of said lower segment being disposed in said lower opening of said first body, and said second end of said lower segment being disposed in said lower opening of said second body.

9. The frame of claim 7, further comprising at least one intermediate segment having a first end and a second end, said intermediate segment being disposed between said upper segment and said lower segment.

10. The frame of claim 7, wherein said first unitary body has a first extended portion and said second unitary body has a second extended portion, and wherein said first lifting eye is substantially disposed in said first extended portion and said second lifting eye is substantially disposed in said second extended portion.

11. An apparatus, comprising:
a first lifting plate having a first unitary body, said first unitary body having a lifting eye and at least one opening;
a second lifting plate having a second unitary body, said second unitary body having a lifting eye and at least one opening;
an upper segment having a first end and a second end;
a lower segment having a first end and a second end;
a coupling means for coupling said lifting plates to said upper segment and said lower segment;
said first end of said upper segment and said first end of said lower segment being disposed in said opening of said first unitary body and said second end of said upper segment and said second end of said lower segment being disposed in said opening of said second unitary body;
further comprising at least one intermediate segment having a first end and a second end, said intermediate segment being disposed between said upper segment and said lower segment; and
wherein said first and second ends of said upper and lower segments each has a vertical aperture, and wherein said coupling means comprises:
an elongated member having a first end and a second end, said elongated member being capable of passing through said vertical apertures; and
a locking member disposed one of said first or second ends of said elongated member to couple said upper segment to said lower segment.

12. The apparatus of claim 11, wherein said intermediate segment has a central vertical passage, and where said elongated member is capable of passing through said central vertical passage.

13. The apparatus of claim 11, further comprising:
two upper sleeves, each having a vertical bore and an opening;
two lower sleeves, each having a vertical bore and an opening;
wherein said opening in each of said upper sleeve is capable of receiving said first ends and second ends of said upper segment; and
wherein said opening in each of said lower sleeves is capable of receiving said first and second ends of said lower segment.

14. The apparatus of claim 13, wherein:
said vertical bores of said upper sleeves align with said vertical bore of said first and second ends of said upper segment; and
said vertical bores of said lower sleeves align with said vertical bores of said first and second ends of said lower segment.

15. The apparatus of claim 14, wherein said elongated member is capable of passing through said vertical bore of said upper sleeve and through said vertical bore of said lower sleeve.

16. An apparatus, comprising:
a first lifting plate having a first body, said first body having a lifting eye and at least one opening;
a second lifting plate having a second body, said second body having a lifting eye and at least one opening;
an upper segment having a first end and a second end;
a lower segment having a first end and a second end; and
a coupling means for coupling said lifting plates to said upper segment and said lower segment;
said first end of said upper segment and said first end of said lower segment being disposed in said opening of said first body and said second end of said upper segment and said second end of said lower segment being disposed in said opening of said second body;
wherein said first and second lifting plates each has a body having a central vertical axis and a central horizontal axis, and wherein each of said lifting eyes has a center, said center of said lifting eyes being above said respective horizontal axis and offset from said respective vertical axis.

17. An apparatus, comprising:
a first lifting plate having a first unitary body, said first unitary body having a lifting eye and at least one opening;
a second lifting plate having a second unitary body, said second unitary body having a lifting eye and at least one opening;
an upper segment having a first end and a second end;
a lower segment having a first end and a second end; and
coupling means for coupling said lifting plates to said upper segment and said lower segment;
said first end of said upper segment and said first end of said lower segment being disposed in said opening of said first unitary body and said second end of said upper segment and said second end of said lower segment being disposed in said opening of said second unitary body;
wherein at least one of said coupling means is a strap.

18. An apparatus, comprising:
a first lifting frame having two outer portions, each outer portion including an upper end and a lower end;
a second lifting frame having outer portions, each outer portion including an upper end and a lower end; and
said first and second lifting frames having a planar lifting plate vertically disposed on each of said outer portions, said lifting plates each having a lifting eye and each having at least one opening for receiving said upper end and said lower end of said each outer portion.

19. The apparatus of claim 18, further comprising:
a first packaging frame; and
a second packaging frame.

20. The apparatus of claim 19, wherein said lifting frames are located between said packaging frames.

21. A lifting plate for lifting, transporting, or storing a plurality of supports supporting a bundle of elongated members, the lifting plate comprising:
- a planar body having a plurality of openings adapted to receive each of the supports, said planar body having a central vertical axis;
- said openings being aligned on said central vertical axis;
- said openings forming support surfaces adapted to engage the supports; and
- said body having an extending portion with an aperture offset from said central vertical axis.

22. The lifting plate of claim 21 wherein said body is unitary and is located on a vertical side of the bundle of elongated members.

23. The lifting plate of claim 21 wherein said extending portion extends toward another lifting plate.

24. The lifting plate of claim 21 wherein said aperture includes an arcuate bearing surface.

25. The lifting plate of claim 21 wherein said openings form surfaces which engage the supports to counter any moments placed on the body during lifting.

26. The lifting plate of claim 21 wherein the lifting force is shared by the engagements between said support surfaces and the supports.

27. An apparatus, comprising:
- a first lifting plate having a first unitary body, said first unitary body having a lifting eye and at least one opening;
- a second lifting plate having a second unitary body, said second unitary body having a lifting eye and at least one opening;
- an upper segment having a first end and a second end;
- a lower segment having a first end and a second end;
- a coupling means for coupling said lifting plates to said upper segment and said lower segment; and
- said first end of said upper segment and said first end of said lower segment being disposed in said opening of said first unitary body and said second end of said upper segment and said second end of said lower segment being disposed in said opening of said second unitary body, wherein:
- said first unitary body has a first upper edge;
- said second unitary body has a second upper edge;
- said upper segment has a top side; and
- wherein said top side of said upper segment is approximately even with said first upper edge and said second upper edge.

28. The apparatus of claim 27, wherein:
- said first unitary body has a first lower edge;
- said second unitary body has a second lower edge; and
- said lower segment has a bottom side;
- wherein said bottom side of said lower segment is approximately even with said first lower edge and said second lower edge.

29. An apparatus, comprising:
- a first segment having a first end and a second end;
- a second segment having a first end and a second end;
- a first planar lifting plate having a first central vertical axis and having a first lifting eye, said first lifting eye having a center;
- a second planar lifting plate having a second central vertical axis and having a second lifting eye, said second lifting eye having a center; and
- wherein said first planar lifting plate engages, along said first central vertical axis, said first end of said first segment and said first end of said second segment and wherein said second planar lifting plate engages, along said second central vertical axis, said second end of said first segment and said second end of said second segment; and
- wherein said center of said first lifting eye is offset from said first central vertical axis and said center of said second lifting eye is offset from said second central vertical axis.

30. The apparatus of claim 29, further comprising a first means for coupling said first end of said first segment to said first end of said second segment and further comprising a second means for coupling said second end of said first segment to said second of said second segment.

* * * * *